US012309901B2

(12) United States Patent
Dimberg et al.

(10) Patent No.: US 12,309,901 B2

(45) Date of Patent: May 20, 2025

(54) CONTROL DEVICE HAVING BUTTONS WITH METALLIC SURFACES AND BACKLIT INDICIA

(71) Applicant: Lutron Technology Company LLC, Coopersburg, PA (US)

(72) Inventors: Chris Dimberg, Easton, PA (US); Kevin J. Heimann, Neffs, PA (US); Brad Michael Kreschollek, Bethlehem, PA (US); Matthew P. McDonald, Phoenixville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/212,910

(22) Filed: Jun. 22, 2023

(65) Prior Publication Data

US 2023/0345607 A1 Oct. 26, 2023

Related U.S. Application Data

(63) Continuation of application No. 17/557,276, filed on Dec. 21, 2021, now Pat. No. 11,729,892, which is a (Continued)

(51) Int. Cl.
*H01H 9/18* (2006.01)
*G09F 9/00* (2006.01)
(Continued)

(52) U.S. Cl.
CPC ............... *H05B 47/19* (2020.01); *G09F 9/00* (2013.01); *G09G 3/20* (2013.01); *H01H 13/83* (2013.01);
(Continued)

(58) Field of Classification Search
CPC .......... H01H 9/16; H01H 9/161; H01H 9/162; H01H 9/182; G05G 1/02; G09F 13/06; G09F 13/08; G09F 13/10
See application file for complete search history.

(56) References Cited

U.S. PATENT DOCUMENTS

| | | |
|---|---|---|
| 1,464,515 A | 8/1923 | Thomas |
| 1,761,868 A | 6/1930 | Burke et al. |

(Continued)

FOREIGN PATENT DOCUMENTS

| | | |
|---|---|---|
| EP | 1808880 A1 | 7/2007 |

OTHER PUBLICATIONS

WO/2017/031463, International Search Report for Application No. PCT/US2016/047890 Mailed on Jul. 11, 2016, 3 pages.

*Primary Examiner* — Ismael Negron

(74) *Attorney, Agent, or Firm* — Condo Roccia Koptiw LLP

(57) ABSTRACT

A control device includes one or more buttons having an illuminated indicia indicating a function. Each button has a translucent button body and an associated lighting element. A veneer covers a front surface of the button body, the veneer being opaque to block transmission of light through the veneer except for an area defining the indicia. The control device may further comprise a button lighting circuit, wherein the button lighting circuit and the associated lighting element are configured to operate at a first illumination intensity and a second illumination intensity. Selection of the button by a user, such as by pressing the button, results in the selected button displaying a greater illumination intensity.

20 Claims, 8 Drawing Sheets

Related U.S. Application Data continuation of application No. 16/944,544, filed on Jul. 31, 2020, now Pat. No. 11,234,321, which is a continuation of application No. 16/541,400, filed on Aug. 15, 2019, now Pat. No. 10,733,926, which is a continuation of application No. 15/911,581, filed on Mar. 5, 2018, now Pat. No. 10,424,233, which is a continuation of application No. 14/850,800, filed on Sep. 10, 2015, now Pat. No. 9,911,372.

(60) Provisional application No. 62/048,652, filed on Sep. 10, 2014.

(51) Int. Cl.

| | |
|---|---|
| ***G09G 3/20*** | (2006.01) |
| ***H01H 13/83*** | (2006.01) |
| ***H05B 47/175*** | (2020.01) |
| ***H05B 47/19*** | (2020.01) |
| *G09F 13/04* | (2006.01) |
| *H01H 13/02* | (2006.01) |
| *H05B 47/195* | (2020.01) |

(52) U.S. Cl.

CPC ....... *H05B 47/175* (2020.01); *G09F 13/0427* (2021.05); *H01H 2009/187* (2013.01); *H01H 13/023* (2013.01); *H01H 2209/0021* (2013.01); *H01H 2219/039* (2013.01); *H01H 2219/062* (2013.01); *H01H 2219/066* (2013.01); *H05B 47/195* (2020.01)

(56) References Cited

U.S. PATENT DOCUMENTS

| | | | | | |
|---|---|---|---|---|---|
| 1,977,261 | A | | 10/1934 | Brown et al. | |
| 2,109,054 | A | * | 2/1938 | Soreng | H01H 9/16 200/312 |
| 3,188,437 | A | | 6/1965 | Lauren et al. | |
| 4,131,777 | A | | 12/1978 | Bailey et al. | |
| 4,277,665 | A | * | 7/1981 | Kondo | H01H 9/16 200/314 |
| 4,667,073 | A | | 5/1987 | Osika | |
| 4,954,675 | A | * | 9/1990 | Iwata | H01H 13/023 200/317 |
| 5,036,440 | A | * | 7/1991 | Takii | F21V 9/08 362/23.18 |
| 5,120,920 | A | | 6/1992 | Moriike | |
| 5,456,955 | A | * | 10/1995 | Muggli | G09F 9/33 219/121.69 |
| 5,512,718 | A | * | 4/1996 | Larose | H01H 13/70 200/313 |
| 5,536,543 | A | | 7/1996 | Papandreou | |
| 5,736,233 | A | * | 4/1998 | Fye | G09F 13/08 428/206 |
| 5,911,317 | A | | 6/1999 | Tsai | |
| 6,180,048 | B1 | | 1/2001 | Katori et al. | |
| 6,803,728 | B2 | | 10/2004 | Balasubramaniam et al. | |
| 6,905,901 | B1 | * | 6/2005 | Fye | B60Q 3/14 445/24 |
| 7,134,205 | B2 | | 11/2006 | Bruennel | |
| 9,349,309 | B1 | | 5/2016 | Tsaturyan et al. | |
| 9,443,676 | B2 | | 9/2016 | Na | |
| 9,575,587 | B2 | | 2/2017 | O'Keeffe | |
| 9,763,302 | B2 | | 9/2017 | McDonald et al. | |
| 9,911,372 | B2 | * | 3/2018 | Dimberg | H05B 47/19 |
| 10,424,233 | B2 | | 9/2019 | Dimberg et al. | |
| 11,234,321 | B2 | | 1/2022 | Dimberg et al. | |
| 2011/0018161 | A1 | | 1/2011 | Yang et al. | |
| 2014/0001977 | A1 | | 1/2014 | Zacharchuk et al. | |
| 2015/0090570 | A1 | | 4/2015 | Niu et al. | |
| 2015/0356895 | A1 | | 12/2015 | Boppart et al. | |
| 2016/0307714 | A1 | | 10/2016 | Bhate et al. | |
| 2017/0053753 | A1 | | 2/2017 | Adams et al. | |

* cited by examiner

CONTROL DEVICE HAVING BUTTONS WITH METALLIC SURFACES AND BACKLIT INDICIA

CROSS-REFERENCE TO RELATED APPLICATIONS

This application is a continuation of U.S. patent application Ser. No. 17/557,276 (now U.S. Pat. No. 11,729,892), which is a is a continuation of U.S. patent application Ser. No. 16/944,544 (now U.S. Pat. No. 11,234,321), which is a continuation of U.S. patent application Ser. No. 16/541,400 (now U.S. Pat. No. 10,733,926), which is a continuation of U.S. patent application Ser. No. 15/911,581 (now U.S. Pat. No. 10,424,233), which is a continuation of U.S. patent application Ser. No. 14/850,800 (now U.S. Pat. No. 9,911,372), which claims priority to U.S. Provisional Ser. No. 62/048,652, filed Sep. 10, 2014, the disclosures of each of which are incorporated herein by reference in their entireties.

BACKGROUND

Load control devices may be used to control the amount of power delivered from a power source, such as an alternating-current (AC) power source, to one or more electrical loads. An example of such a load control device is a wall-mounted dimmer switch. Load control devices may be integrated into home automation systems.

Home automation systems, which have become increasingly popular, may be used by homeowners to integrate and/or control multiple electrical and/or electronic devices in their homes. For example, a homeowner may connect devices such as appliances, lights, blinds, thermostats, cable or satellite boxes, security systems, telecommunication systems, and the like to each other via a wireless network.

The homeowner may control such devices using a central (e.g., automated) controller, a dedicated remote control device (e.g., a wall-mounted keypad), a user interface provided via a phone, tablet, computer, or other device that is directly connected to a home network or remotely connected via the Internet, and so on. These devices may communicate with each other and/or with a control device, for example to improve efficiency, convenience, and/or usability of the devices.

Dedicated remote control devices, such as wall-mounted keypads, may be manufactured to be aesthetically pleasing. For example, wall-mounted keypads may include faceplates and/or buttons made of metal, glass, or other materials to lend the keypads a luxury aesthetic when compared to traditional plastic keypads.

The buttons and/or faceplates of such keypads may be marked with indicia. The indicia may be representative of functions that the keypad is configured to execute or that the keypad is configured to cause to be executed. Such indicia are typically marked on outer surfaces of the keypad. For example, indicia may be painted onto the outer surfaces of buttons of the keypad. However, keypads having such indicia may exhibit limitations. For instance, indicia that is painted onto the outer surface of a button may not be visible to a user in low light. Moreover, such indicia may at least partially wear off over time as the keypad is operated, thereby diminishing the aesthetic of the keypad.

SUMMARY

As described herein, a veneer may be configured to be secured to a component of a control device, such as a wall-mounted keypad. The control device may be configured for use with a load control device, such as a dimmer switch. The veneer may be configured to be attached to a backlit button of the control device. The veneer may have a surface finish applied thereto.

The veneer may include a plate portion that has one or more indicia machined therethrough. The veneer may further include a filler material that is disposed in the one or more indicia. The indicia may be representative of one or more commands for controlling an electrical load. The indicia may include alphanumeric characters, icons, or the like.

The indicia may define an open portion, a floating portion, and one or more ribs that suspend the floating portion relative to the open portion. The one or more ribs may be configured to create an optical illusion that conceals the ribs from view relative to a user of the control device. For example, the rib may define an upper surface that is recessed relative to a front surface of the veneer, and may define opposed sides that extend from a base of the rib to the upper surface. The sides may be tapered between the base and the upper surface, such that the upper surface is narrower than the base. The sides and the upper surface of the rib may be unfinished.

DETAILED DESCRIPTION

Figure 1:
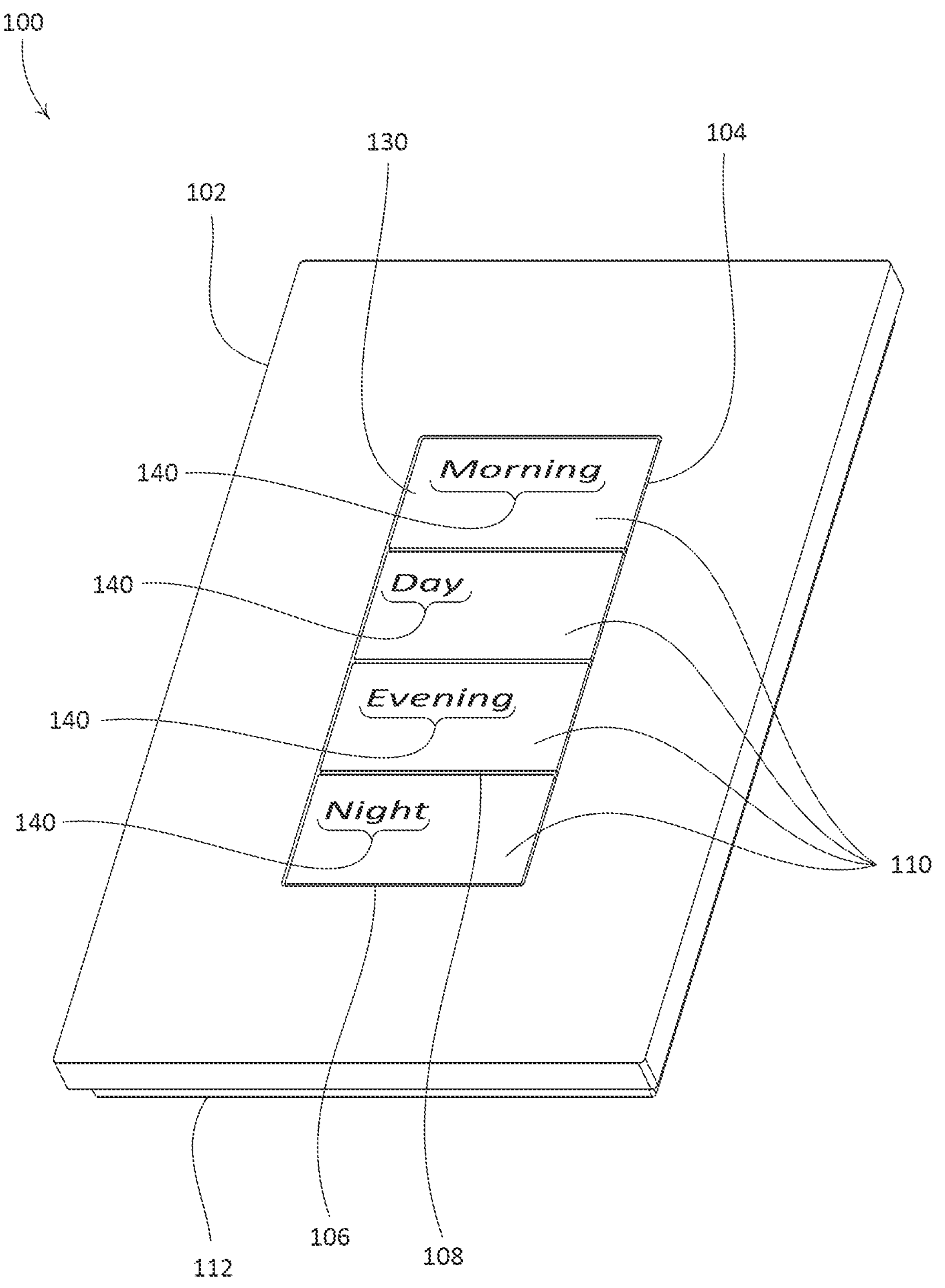
FIG. 1 is a perspective view of an example control device, configured as a wall-mounted keypad, for use in a load control system for controlling the amount of power delivered to one or more electrical loads.

FIG. 1 depicts an example control device that may be configured for use in a load control system for controlling one or more load control devices and/or electrical loads, such as lighting loads, motorized window treatments, or the like. As shown, the example control device is configured as a wall-mounted keypad 100. The keypad 100 may include a faceplate 102, one or more buttons 110, and a housing 112 that is configured to be mounted to a structure, such as an interior wall of a building. The illustrated keypad 100 may be configured to control a load control device, such as a load control device configured to control an amount of power delivered to one or more electrical loads (e.g., one or more lighting loads) from an alternating-current (AC) power source.

The faceplate 102 may define an opening 104 that extends therethrough and that is configured to at least partially receive the buttons 110. For example, in accordance with the illustrated keypad 100, the opening 104 may be sized to receive the buttons 110 such that a gap 106 is defined between inner edges of the opening 104 and corresponding outer peripheral surfaces of the buttons 110. The keypad 100 may be configured such that the gap 106 remains uniform around the perimeter of the opening 104. The keypad 100 may further be configured such that facing edges of adjacent buttons 110 are spaced apart from each other by a gap 108 that is substantially the same as (e.g., equal to) the gap 106 between the buttons 110 and the opening 104 of the faceplate 102.

The faceplate 102 and the buttons 110 may be made of the same material, or may be constructed using the same mix of materials. Alternatively, the faceplate 102 and the buttons 110 may be made of different materials. In accordance with an example implementation of the keypad 100, the buttons 110 may be made of plastic and may have metal veneers that are attached thereto, and the faceplate 102 may be made of the same metal as the button veneers. The faceplate 102 may be configured to be attached to (e.g., removably attached to) the housing 112.

The illustrated keypad 100 includes four buttons 110 that are rectangular in shape and are of the same size. However, it should be appreciated that the keypad 100 is not limited to buttons having the illustrated button geometries. For example, the keypad 100 may alternatively include more or fewer buttons having the same or different geometries and/or sizes.

Figure 2:
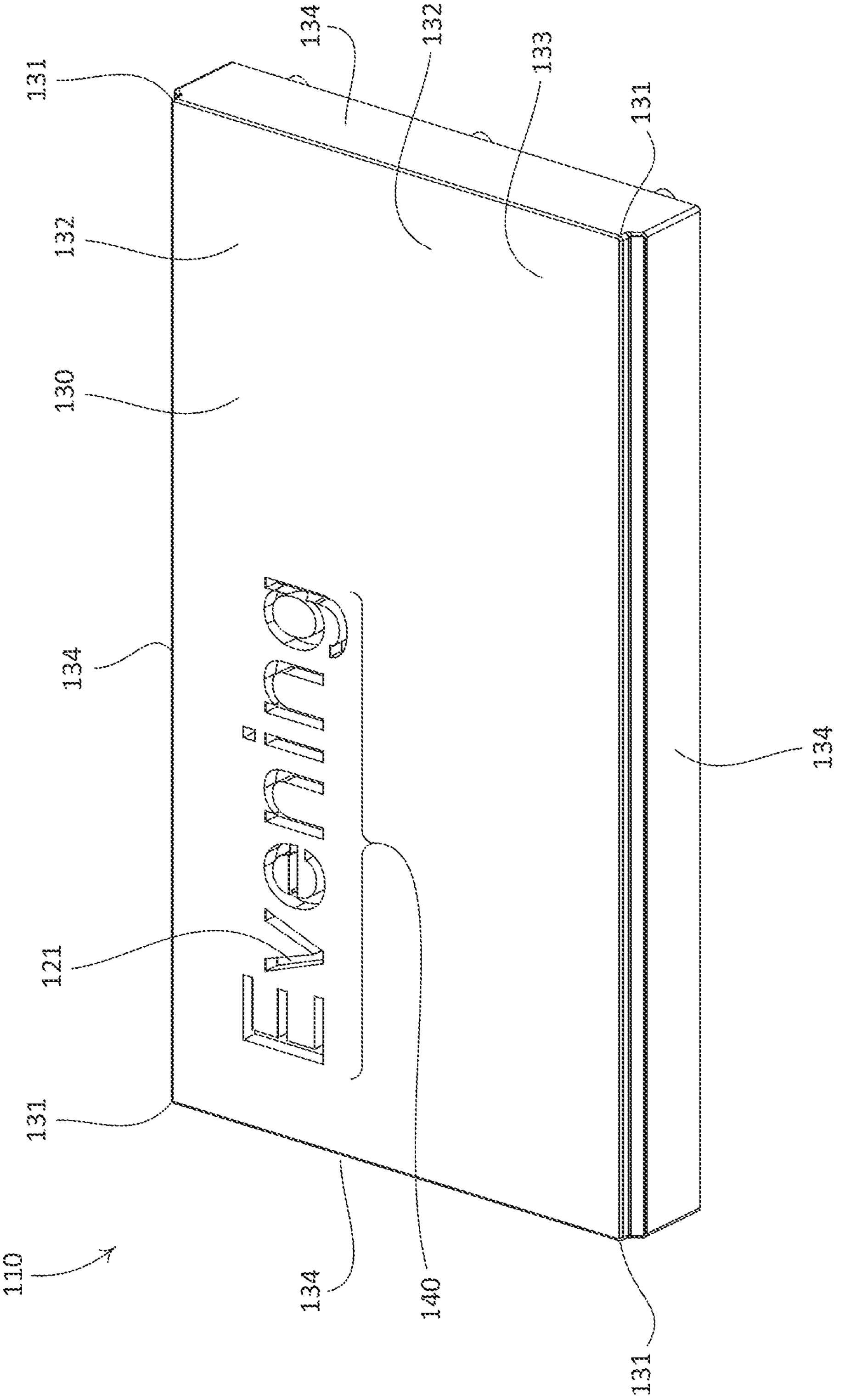
FIG. 2 is a front perspective view of an example button that may be implemented in a control device, the button including a button base and a veneer with machined indicia that is attached to the button base.
Figure 3:
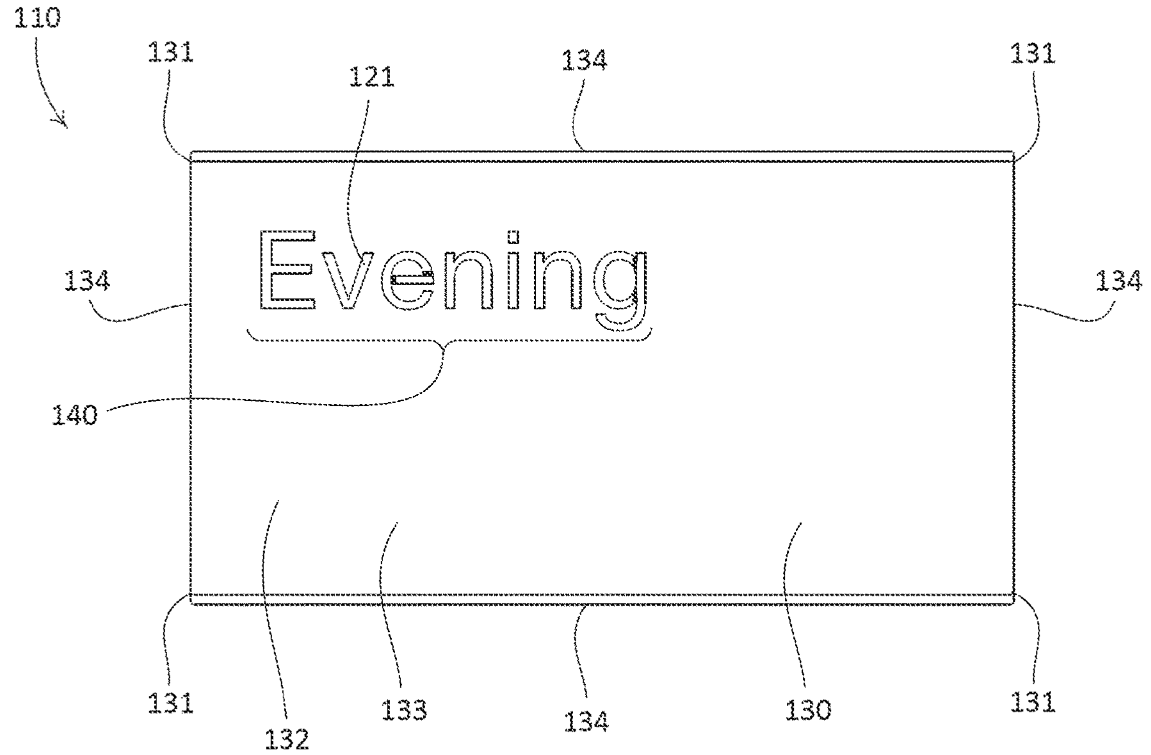
FIG. 3 is a front elevation view of the example button illustrated in FIG. 2.
Figure 4:
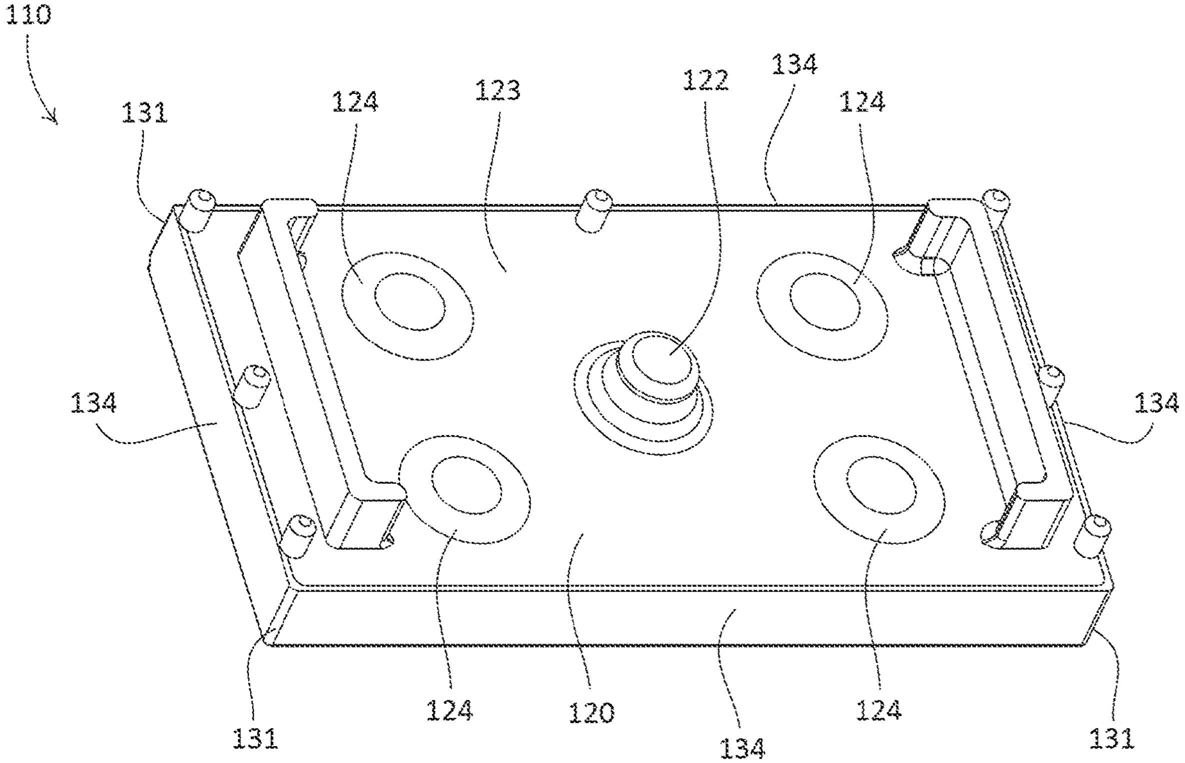
FIG. 4 is a rear perspective view of the example button illustrated in FIG. 2.

The buttons 110 may be made of a mix of materials. For example, as shown in FIGS. 2-4, each button 110 may include a body 120 that is made of a first material (e.g., plastic), and may include a veneer 130 that is made of a different material (e.g., metal) and that is attached to the body 120 of the button 110.

Each veneer 130 may have an indicium 140 or indicia 140 formed therein, such as cut therethrough. The indicia 140 may be representative of a function that the keypad 100 is configured to execute or that the keypad is configured to cause to be executed. For example, the indicia 140 may be representative of a command for controlling an electrical load. In accordance with an example implementation of the keypad 100, the indicia 140 may be representative of a message that the keypad 100 is configured to transmit, for instance a digital message that includes a command for execution by a load control device that is associated with the keypad 100. In accordance with an alternative example implementation, the keypad 100 may include an integral load control circuit (e.g., a dimming circuit), and the command may cause the integral load control circuit to control an electrical load that is electrically connected thereto. The indicia 140 of a particular button 110 may include one or more visual representations of a function associated the button 110, such as, for example, one or more alphanumeric characters, icons, etc. in any combination.

In accordance with the buttons 110 of the illustrated keypad 100, the indicia 140 may be words that are indicative of respective functions that are invoked by depressing the buttons 110. The indicia 140 may be cut through the veneers 130 of the buttons 110 via one or more machining processes. For example, in accordance with an example implementation, indicia 140 may be cut through the veneers 130 via a machine engraving process executed by an engraving machine. The keypad 100 may include one or more lighting elements (not shown) that are configured to illuminate respective interiors of the buttons 110, such that the indicia 140 are backlit from within an interior of the keypad 100. For example, the keypad 100 may include a plurality of lighting elements, such as light emitting diodes (LEDs), that are disposed within the housing 112 of the keypad 100, behind the buttons 110, and that are configured to backlight the buttons 110. In this regard, the illustrated keypad 100 may be referred to as a backlit keypad or control device.

Examples of button backlighting systems are described in greater detail in commonly-assigned U.S. Provisional Patent Application No. 62/048,658, titled "Control Device Having Buttons With Multiple-Level Backlighting," the entire disclosure of which is incorporated herein by reference.

The keypad 100 may be configured to transmit one or more digital messages to one or more external load control devices (e.g., dimmer switches) and/or electrical loads via a communication link, for example in response to one or more buttons 110 being depressed. The one or more digital messages may include, for example, one or more commands for execution by the one or more external load control devices to control respective electrical loads (e.g., lighting loads). The communication link may comprise a wired communication link or a wireless communication link, such as a radio-frequency (RF) communication link. In accordance with an alternative configuration, the keypad 100 may further include an internal load control circuit (not shown) for controlling the power delivered to one or more electrical loads (e.g., lighting loads). Examples of load control systems having remote control devices, such as the keypad 100, are described in greater detail in commonly-assigned U.S. Provisional Patent Application No. 62/150,227, titled "Control Devices Having Independently Suspended Buttons For Controlled Actuation," U.S. Pat. No. 6,803,728, issued Oct. 12, 2004, entitled "System For Control Of Devices," and U.S. Patent Application Publication No. 2014/0001977, published Jan. 2, 2014, entitled "Load Control System Having Independently-Controlled Units Responsive To A Broadcast Controller," the entire disclosures of which are incorporated herein by reference.

Figure 6:
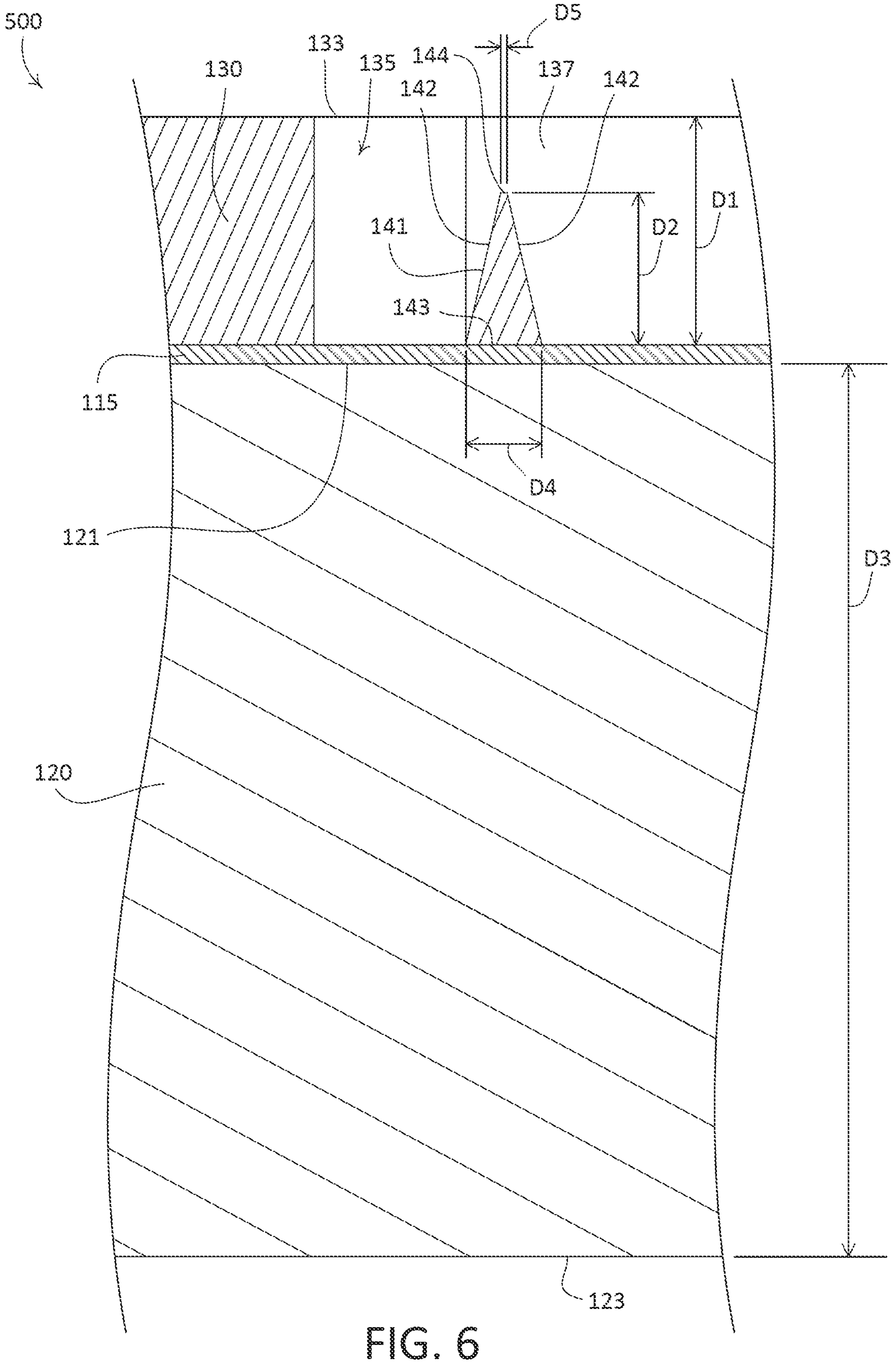
FIG. 6 is a partial cross-section of the example indicium illustrated in FIG. 5.

As shown in FIGS. 2-4, an example button 110 may include a body 120 and a veneer 130 that is attached to a front surface of the body 120. The body 120 may be referred to as a button base of the button 110. The veneer 130 may be attached to a front surface 121 of the body 120, for example using an adhesive 115, such as glue (e.g., as shown in FIG. 6). The front surface 121 of the body 120 may face outward when the button 110 is installed in the keypad 100, and may be referred to as an outer surface of the body 120. The veneer 130 may have one or more indicia 140 defined therein. The indicia 140 may expose one or more portions of the front surface 121 of the body 120 of the button 110.

The veneer 130 may include a plate portion 132 and may define one or more peripheral walls 134 that extend rearward from the plate portion 132. The plate portion 132 may define a front surface 133 of the veneer 130. As shown, the plate portion 132 may define a flat, substantially planar front surface 133. The plate portion 132 and the peripheral walls 134 may define four corners 131 of the veneer 130.

The veneer 130 may be made of an opaque material through which little or no light may pass. In accordance with the illustrated example, the veneer 130 may be formed from a sheet of metal, such as brass, aluminum, or the like. Alternatively, the veneer 130 may be machined from a block of material (e.g., metal), may be molded (e.g., via an injection molding process), may be fabricated via an additive manufacturing process (e.g., via a 3D printing process), or may otherwise be manufactured.

The veneer 130 may be formed, for example by performing an embossing process, a progressive stamping process, or the like on the sheet of metal. The sheet of metal may have a surface finish applied thereto, such as plated brass or anodized aluminum, for example. The surface finish may be applied to the veneer 130 before the indicia 140 are machined in the veneer 130.

The veneer 130 may be formed such that the veneer 130 at least partially encloses one or more portions of the body 120. For example, as shown, the veneer 130 may be configured such that when the plate portion 132 abuts the front surface 121 of the body 120 (e.g., when the veneer 130 is attached to the body 120), the peripheral walls 134 wrap around respective sides of the body 120 (as shown in FIG. 4). As shown in FIG. 4, the body 120 may define a post 122 that extends from a rear surface 123 of the body 120. The rear surface 123 may be referred to as an inner surface of the body 120. The post 122 may be configured to actuate a switch (not shown) inside the keypad 100 when the button 110 is actuated (e.g., pressed), for example by a user of the keypad 100.

The body 120 of the button 110 may be made of any suitable material, such as plastic. In accordance with the illustrated example, the body 120 may be made of a translucent material, for instance white plastic, such that when the body 120 is backlit, light may pass through the body 120 and reach an inner surface of the veneer 130, for example an inner surface of the plate portion 132. Such light may be emitted, for example, from the interior of a control device in which the button 110 is installed, such as the keypad 100. In accordance with such an implementation, the indicia 140 of the veneer 130 may expose corresponding underlying surfaces of the body 120 (e.g., portions of the front surface 121), such that the indicia 140 may be illuminated when the body 120 is backlit. In this regard, the veneer 130 may be configured to be secured to a backlit button of a control device.

Each button 110 may be backlit by one or more light-emitting diodes (LEDs). The one or more LEDs may be located, for example, behind the button 110 in the interior of the keypad 100 (e.g., within the housing 112). Illumination from the one or more LEDs may shine through the translucent material of the body 120, but may not shine through the veneer 130, such that the indicia 140 are illuminated relative to surrounding portions of the veneer 130. In accordance with the illustrated example, the keypad 100 may include sixteen LEDs (not shown), with four LEDs located proximate to (e.g., behind) each button 110.

As shown in FIG. 4, the body 120 may define one or more lens features 124, for example in the rear surface 123. Each LED may be located proximate to the lens features 124 of a corresponding one of the buttons 110. The lens features 124 of each button 110 may operate to disperse light from the LEDs evenly across the front surface 121 of the body 120, for instance when the body 120 is made of a translucent material. It should be appreciated that the keypad 100 is not limited to sixteen LEDs. For example, the keypad 100 may alternatively be implemented with more or fewer LEDs, such as one LED, located proximate to (e.g., behind) each button 110. In another example, the keypad 100 may alternatively include four LEDs, with each LED located adjacent to a corresponding one of the buttons 110 for illuminating the buttons 110 through respective sides of the buttons 110. In another example, the keypad 100 may include a light guide assembly (e.g., a light guide assembly that includes a light guide film layer) that when illuminated (e.g., by light emitted by respective LEDs that enters the sides of the light guide assembly), may operate to illuminate the rear surface 123 of the body. The keypad 100 may be configured to backlight the buttons 110 such that the indicia 140 of a selected button 110 are illuminated to a first surface illumination intensity, and such that the respective indicia 140 of the other buttons 110 are illuminated to a second surface illumination intensity. The first surface illumination intensity may be greater than the second surface illumination intensity, such that a user may identify which button 110 is currently selected based upon the intensity of the illumination of the respective indicia 140 of the buttons 110.

Each veneer 130 may include one or more indicia, such as indicia 140 that are defined in the plate portion 132 of the veneer 130. For example, the indicia 140 may be formed during a machining process. As shown, the indicia 140 may extend into the front surface 133 of the veneer 130 and through the plate portion 132. The front surface 133 of the veneer 130 may alternatively be referred to as an outer surface of the veneer 130.

The illustrated indicia 140 include letters that form a word. However, the indicia 140 are not limited to letters, and may include any combination of alphanumeric characters, icons (e.g., symbols), or the like. The indicia 140 may be representative of a command for controlling an electrical load. For example, the indicia 140 may be representative of: a command message that may be transmitted by a control device in which the button 110 is operatively installed (e.g., the keypad 100); of a command that is executed internally by such a control device; of a result of the performance of a command; or the like. To illustrate, one or more command messages may be transmitted by such a control device in response to one or more actuations of the button 110. For example, the indicia 140 of a button 110 may be representative of a preset (e.g., a lighting scene) and the one or more command messages cause one or more load control devices that are associated with the keypad 100 to adjust corresponding electrical loads in order to implement the preset.

The veneer 130 may include a filler material (not shown) that is disposed into the indicia 140. The filler material may prevent the accumulation of debris in the indicia 140. The filler material may, for example, be disposed into the indicia 140 such that the filler material is coplanar with the front surface 133 of the veneer 130.

Figure 5:
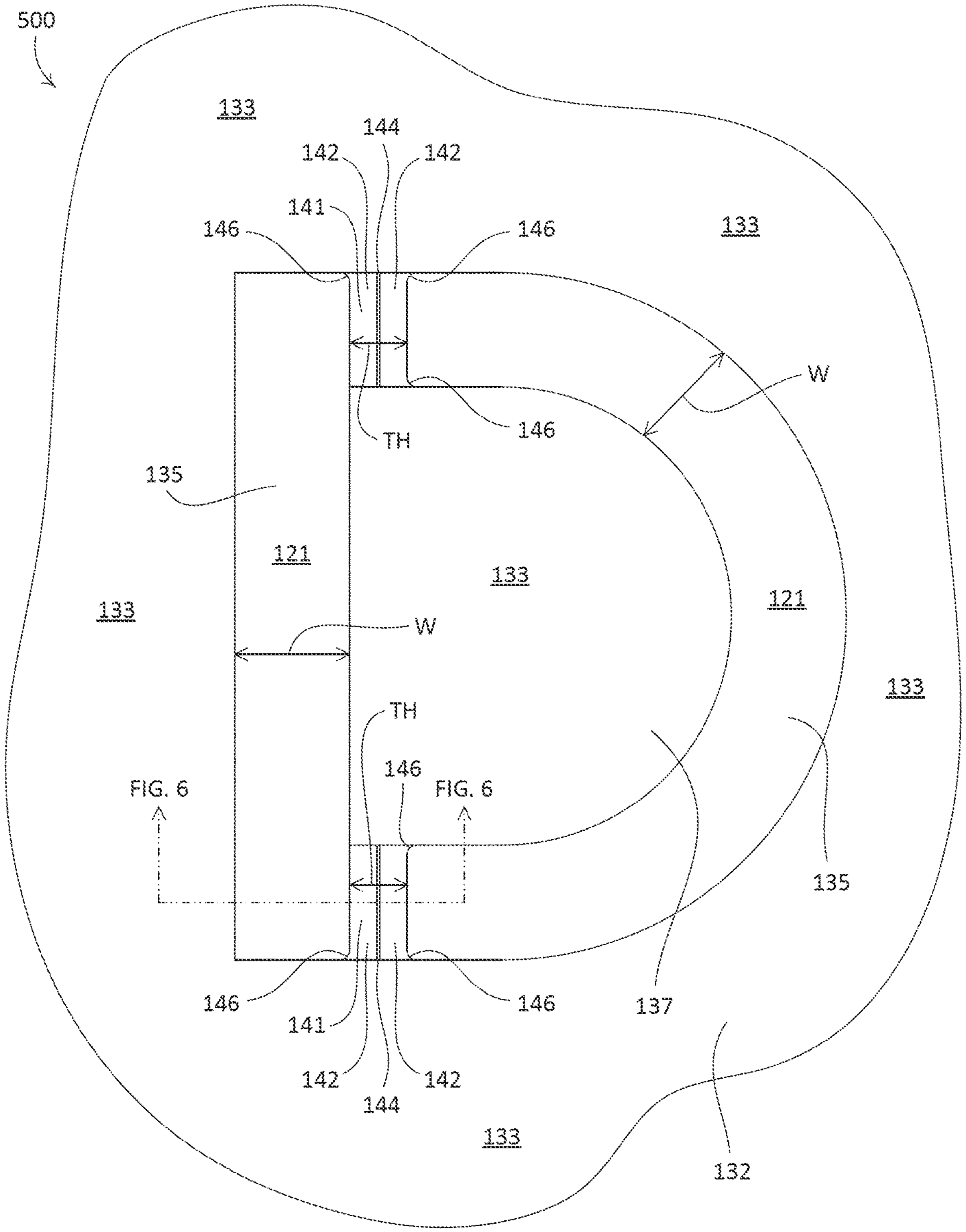
FIG. 5 depicts an example indicium that may be machined into a veneer secured to the button of a control device.

FIG. 5 depicts a portion 500 of the indicia 140 of the "Day" button 110 of the example keypad 100 shown in FIG. 1, in particular the letter capital "D." As shown, the plate portion 132 of a veneer 130, once machined with indicia 140, may define one or more open portions 135 that extend through the plate portion 132, and may define one or more floating portions 137, such as that defined by the center of the "D." The open portions 135 and floating portions 137 of indicia 140 may be referred to as being defined by the indicia 140. In accordance with the illustrated font used in the example indicia 140 (as shown in FIGS. 1-5), the open portions 135 may have respective widths W of approximately 0.009 inches.

The plate portion 132 may further define one or more ribs 141 that suspend one or more corresponding floating portions 137 relative to one or more open portions 135. For example, in accordance with the illustrated "D," the plate portion 132 defines two ribs 141 that suspend the floating portion 137 relative to the two open portions 135. The ribs 141 within a portion of indicia 140, for instance within a particular alphanumeric character, may be operative to hold respective one or more floating portions 137 of the alphanumeric character in position relative to one or more open portions 135 of the alphanumeric character. The ribs 141 may hold one or more floating portions 137 in position, for example, during machining of the indicia 140. The indicia 140 may be machined into the veneer 130 before the veneer 130 is attached to the body 120 of a corresponding button 110. Alternatively, the indicia 140 may be machined after the veneer 130 is attached to the body 120 of the button 110, thereby exposing corresponding portions of the front surface 121 of the body 120. In accordance with an example implementation, if the indicia 140 are machined after the veneer 130 is attached to the body 120 of the button 110, an engraving bit of an engraving machine may extend through both the veneer 130 and the adhesive 115, and into the body 120 of the button 110 to ensure that the body 120 is exposed in the open portions 135 of the indicia 140.

Figure 7:
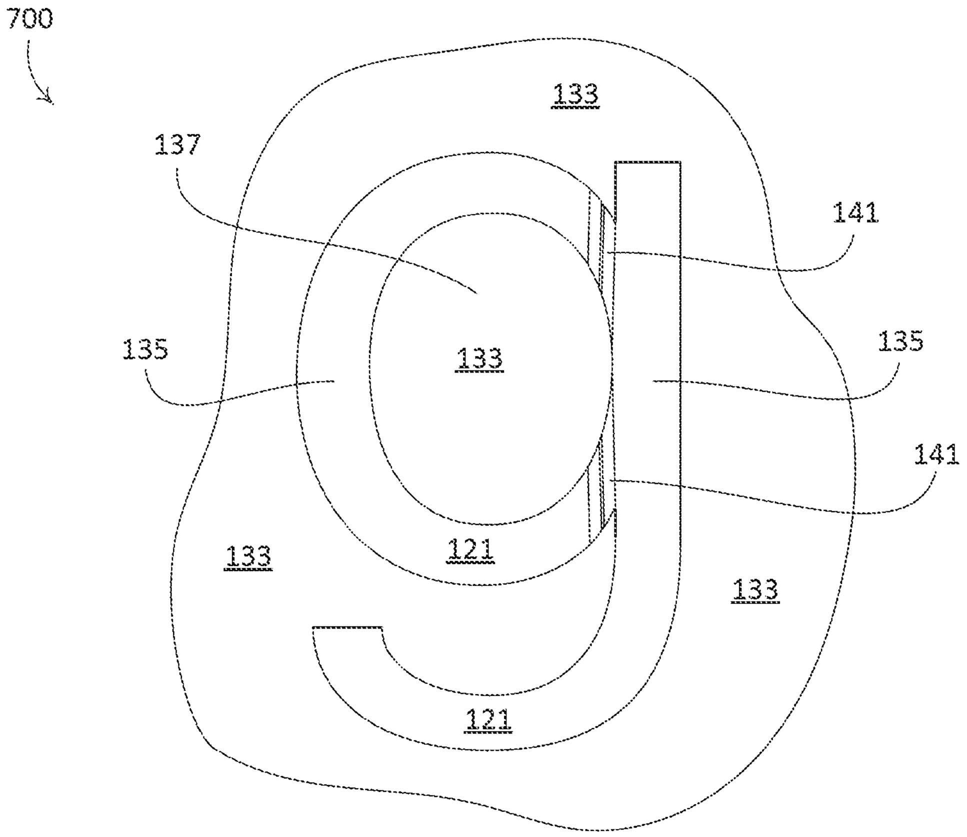
FIG. 7 depicts another example indicium that may be machined into a veneer secured to the button of a control device.
Figure 8:
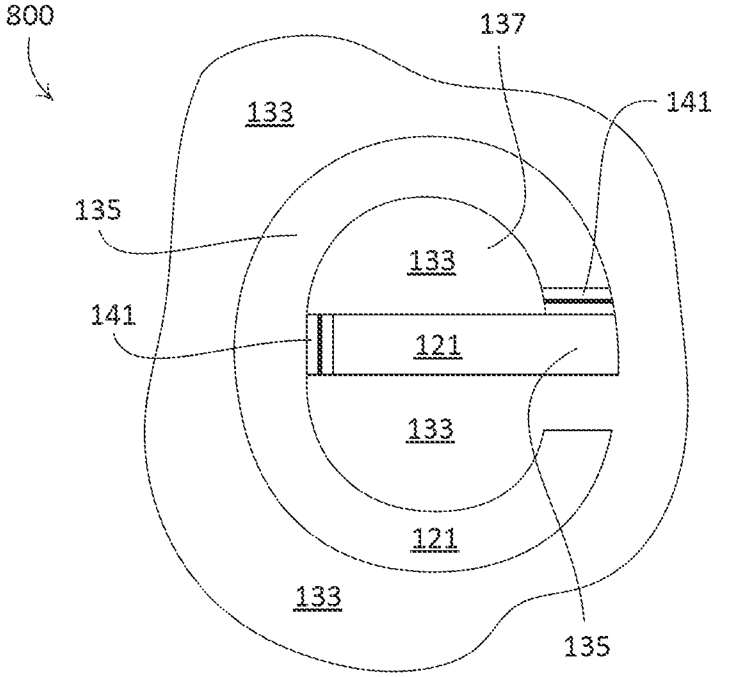
FIG. 8 depicts another example indicium that may be machined into a veneer secured to the button of a control device.
Figure 9:
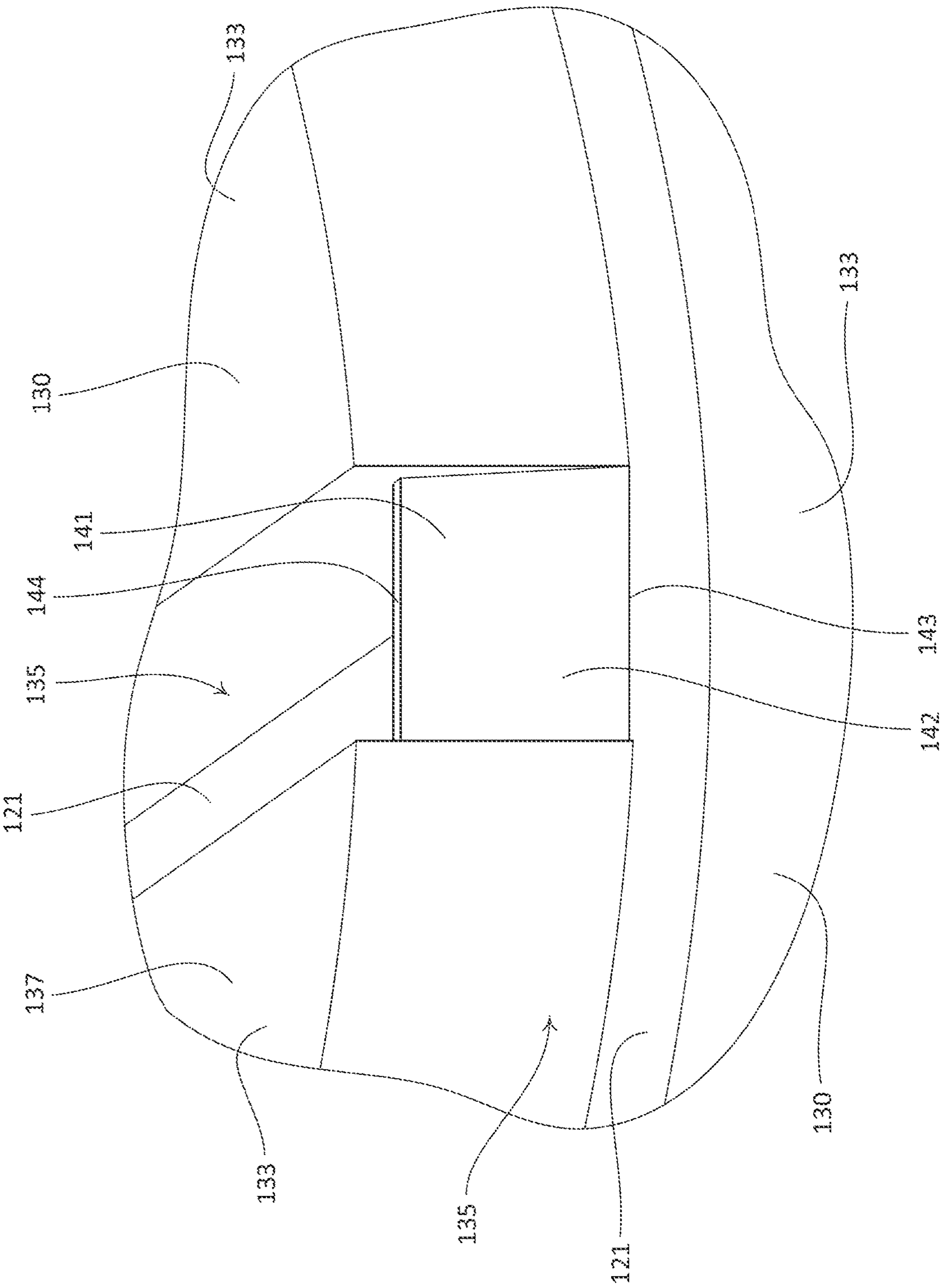
FIG. 9 is a perspective view of a rib of the example indicium illustrated in FIG. 8.

It should be appreciated that the ribs 141 of a particular portion of indicia 140, such as the letter "D," may have the same thickness (e.g., TH). Alternatively, one or more ribs 141 of the indicia 140 may have different thicknesses. Reducing the thickness of the ribs 141 may cause the ribs 141 to be less visible, for example by a user of a control device in which the button is installed 110, such as the keypad 100. Reducing the thickness of one or more ribs 141 of indicia 140 may improve the aesthetic characteristics of the indicia 140, and thus of the button 110, for instance when the button 110 is backlit. It should further be appreciated that indicia 140 may have any number of ribs 141 having the same or different dimensions, and that the ribs 141 may be located in any locations within the indicia 140. FIGS. 7 and 8 depict example locations of ribs 141 in portions 700, 800 of the indicia 140 of the "Evening" button 110 of the keypad 100; the portions 700, 800 corresponding to "g" and "e" alphanumeric characters of the indicia 140, respectively. FIG. 9 depicts a perspective view of the leftmost rib 141 of the "e" alphanumeric character of the indicia 140 of the "Evening" button 110 of the keypad 100.

One or more ribs 141 of the indicia 140 of a veneer 130 may be configured such that perception of the ribs 141 by a user of the keypad 100 is minimized. For example, the ribs 141 of within a portion of indicia 140 may be configured to create an optical illusion that conceals the ribs 141 from view when the indicia 140 is viewed, for instance by a user of the keypad 100. In this regard, indicia 140 may be configured such that ribs 141 of the indicia 140 are substantially hidden from view to a user of the keypad 100.

With reference to FIG. 6, when the veneer 130 is attached to the front surface 121 of the body 120, the front surface 133 of the veneer 130 may be spaced from the front surface 121 of the body 120 by a distance D1 that corresponds to a thickness of the veneer 130 that may be, for example, approximately 0.015 inches. The distance D1 may also be referred to as the height of the front surface 133 or the height of the veneer 130, relative to the front surface 121 of the body 120. The distance D1 that the front surface 133 of the veneer 130 is spaced from the front surface 121 of the body 120 may be referred to as a first distance.

The illustrated rib 141 defines opposed sides 142, a base 143, and an upper surface 144 that is spaced from the base 143 and that may be referred to as a front surface of the rib 141. As shown, the upper surface 144 of the rib 141 resides in a plane that is substantially parallel with a plane in which the front surface 133 of the veneer 130 resides. In this regard, it may be said that the upper surface 144 of the rib 141 extends parallel to the front surface 133 of the veneer 130.

One or more ribs 141 of the indicia 140 of a veneer 130 may be configured such that the respective upper surfaces 144 of the ribs 141 are spaced inward from the front surface 133 of the veneer 130. In this regard, the upper surfaces 144 of the ribs 141 may be recessed relative to the front surface 133 of the veneer 130. For example, the upper surface 144 of the rib 141 illustrated in FIG. 6 may be spaced from the front surface 121 of the body 120 through a distance D2 that is shorter than the distance D1, and that may be referred to as a second distance. The distance D2 may correspond to a height of the rib 141. For example, the illustrated rib 141 may have a height D2 of approximately 0.010 inches. The front surface 121 of the body 120 may be spaced from the rear surface 123 of the body by a distance D3 that may be, for example, approximately 0.060 inches. The distance D3 may correspond to a thickness of the body 120. In accordance with an alternative configuration of the rib 141, the sides 142 of the rib 141 may converge to a point that is spaced from the front surface 121 of the body 120 (e.g., such that the upper surface 144 is not defined).

The sides 142 of the rib 141 may be sloped, extending upward and tapering inward between the base 143 and the upper surface 144, for instance from the base 143 to the upper surface 144 as shown in FIG. 6, such that the upper surface 144 of the rib 141 may be narrower than the base 143, and such that the rib 141 defines a trapezoidal, essentially triangular cross-section. For example, the rib 141 may define a width at the base 143 having a distance D4 of approximately 0.005 inches, and may define a width at the upper surface 144 having a distance D5 of approximately 0.0005 inches.

It should be appreciated that within a portion of indicia 140 that defines multiple ribs 141, the ribs 141 may define the same or different geometries. For example, the ribs 141 within a portion of indicia 140 may define the same or different heights (e.g., as defined by the distance D2), the same or different widths D4 at the bases 143, and/or the same or different widths D5 at the upper surfaces 144.

The illustrated geometry of the rib 141 may create an optical illusion when viewed, for example by a user of the keypad 100, such that the rib 141 may be essentially concealed from view. For example, the sloped sides 142 of the ribs 141 may operate to reflect light from internal sources (e.g., from one or more LEDs disposed within the housing 112) and/or external sources (e.g., lighting loads in a room in which the keypad 100 is located), which may cause the ribs 141 to essentially disappear from view.

The sides 142 and the upper surfaces 144 of the ribs 141 may be unfinished, exposing shiny material of the veneer 130, which may enhance the optical illusion, thereby further hiding the ribs 141 from view. The ribs 141 may be located to enhance the optical illusion. For example, in accordance with the illustrated portion 500 of the indicia 140 of the "Evening" button 110, the ribs 141 may be oriented vertically and located along the flat side of the central floating portion 137 of the "D" as shown in FIG. 5. Such placement of the ribs 141 may discourage the human eye from noticing the presence of the ribs 141. The ribs 141 may define fillets 146 along respective edges where the ribs 141 interface with inner surfaces of the indicia 140. For example, the fillets 146 may have radii of approximately 0.0035 or fewer inches. It should be appreciated that the ribs 141 are not limited to the illustrated sloped sides 142. For example, one or more ribs 141 of within a portion of indicia 140 may define other side geometries, such as sides that are perpendicular with respect to the front surface 133 of the veneer 130.

It should be appreciated that indicia 140 having one or more floating portions 137 are not limited to including one or more ribs 141 to suspend the one or more floating portions 137. For example, the veneer 130 of a button 110 may be attached to the front surface 121 of the body 120 of the button 110 before the indicia 140 is machined in the veneer 130. The veneer 130 may be attached to the front surface 121 of the body 120 using adhesive 115, for example. The adhesive 115 may be selected such that the one or more floating portions 137 are held in place on the front surface 121 of the body 120 as the indicia 140 is machined into the veneer 130. It should further be appreciated that indicia 140 may be defined in the veneer 130 by processes other than machining, such as by chemical photo etching, electrical discharge machining, or the like. It should further still be appreciated that for the purposes of illustration, the distances depicted in the instant figures (e.g., distances D1, D2, D3, D4, and/or D5) are not necessarily to scale, and may not accurately reflect particular distance values described herein.

Figure 10:
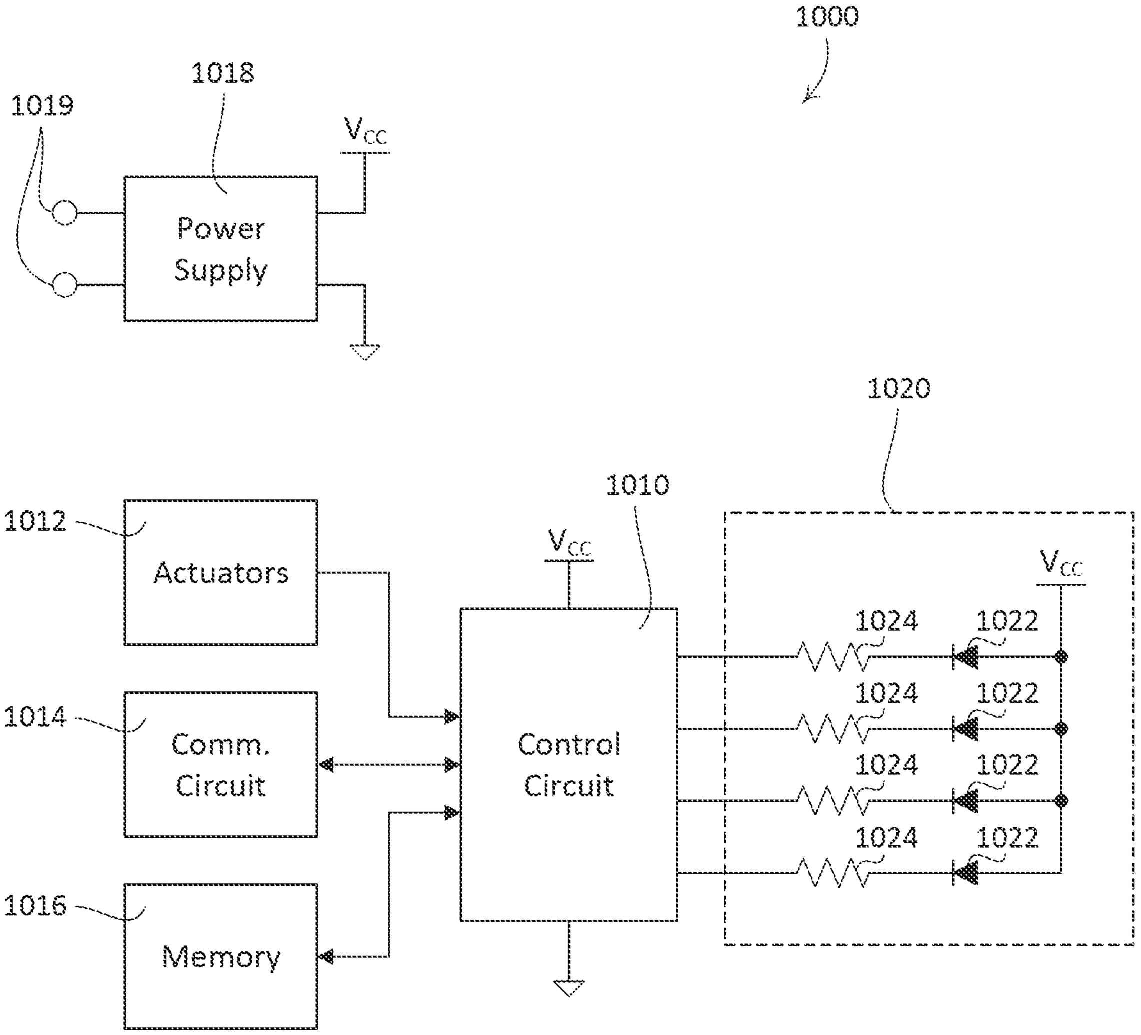
FIG. 10 is a simplified block diagram of an example control device.

FIG. 10 is a simplified block diagram of an example control device 1000 that may be implemented, for example, as the keypad 100. The control device 1000 may include a control circuit 1010. The control circuit 1010 may include one or more of a processor (e.g., a microprocessor), a microcontroller, a programmable logic device (PLD), a field programmable gate array (FPGA), an application specific integrated circuit (ASIC), or any suitable processing device. The control device 1000 may include one or more actuators 1012 (e.g., mechanical tactile switches). The one or more actuators 1012 may be actuated in response to actuations of corresponding ones of the buttons 110. The control circuit 1010 may be operatively coupled to the actuators 1012 for receiving user inputs.

The control device 1000 may include a communication circuit 1014, such as a wired communication circuit or a wireless communication circuit (e.g., an RF transmitter coupled to an antenna for transmitting RF signals). The control circuit 1010 may be communicatively coupled to the communication circuit 1014 for transmitting one or more digital messages, for example in response to actuations of the actuators 1012. Alternatively, the communication circuit 1014 may include an RF receiver for receiving RF signals, an RF transceiver for transmitting and receiving RF signals, or an infrared (IR) transmitter for transmitter IR signals.

The control circuit 1010 may be configured to receive one or more digital messages including, for example via the communication circuit 1014. Such digital messages may include, for example, information associated with a selected preset and/or the status of an electrical load controlled by an external load control device.

The control device 1000 may include a memory 1016. The memory 1016 may be communicatively coupled to the control circuit 1010. The control circuit 1010 may be configured to use the memory 1016 for the storage and/or retrieval of, for example, commands and/or preset information to transmit in response to actuations of the actuators 1012. The memory 1016 may be implemented, for example, as an external integrated circuit (IC) or as an internal circuit of the control circuit 1010.

The control device 1000 may include a power supply 1018 for generating a direct-current (DC) supply voltage Vcc for powering one or more of the control circuit 1010, the communication circuit 1014, the memory 1016, and other low-voltage circuitry of the control device 1000. The power supply 1018 may be coupled to an alternating-current (AC) power source or an external DC power source via electrical connections 1019. Alternatively, the control device 1000 may include an internal power source (e.g., one or more batteries) for supplying power to the power supply 1018.

The control device 1000 may further comprise a backlighting circuit 1020 for illuminating indicia on one or more buttons of the control device 1000 (e.g., for illuminating the indicia 140 in the veneers 130 of the buttons 110 of the keypad 100). The backlighting circuit 1020 may include one or more lighting elements, for instance four LEDs 1022 that may be coupled to respective ports on the control circuit 1010 via respective resistors 1024. The control circuit 1010 may be configured to individually turn each LED 1022 on by pulling the respective port low towards circuit common, such that each LED 1022 is coupled between the supply voltage Vcc and circuit common through a corresponding resistor 1024. The control circuit 1010 may be configured to dim the illumination of each LED 1022 below a first (or maximum) LED illumination intensity, for example by pulse-width modulating the LED current conducted through each LED 1022.

While the control device 1000 shown in FIG. 10 has one LED 1022 for illuminating each button 110, each LED 1022 illustrated in FIG. 10 may be representative of one or more LEDs 1022 coupled in series or parallel. For example, each LED 1022 in FIG. 10 may include four LEDs 1022 coupled in series. The LEDs 1022 may be implemented, for example, as white LEDs (e.g., part number LTW-C191DS5-LR, manufactured by LITE-ON). Each of the resistors 1024 coupled in series with one or more respective LEDs 1022 may have a resistance sized such that a maximum average magnitude of LED current may be approximately 20 mA.

It should be appreciated that the veneer 130 is not limited to being attached to the body 120 of the button 110 using the adhesive 115. For example, the veneer 130 may be configured to be mechanically attached to the body 120 (e.g., via complementary attachment features defined by the veneer 130 and/or by the body 120, using one or more external fasteners, or otherwise).

It should further be appreciated that the example machined indicia illustrated and described herein are not limited to use in veneers that are attached to the buttons of backlit keypads, and that the machined indicia may be defined in the surfaces of other objects. For example, one or more machined indicia may be defined in a veneer (e.g., a metal veneer) that is configured to be attached to a faceplate (e.g., a translucent faceplate) of a control device that is configured for use with a load control device. Filler material may be disposed into the machined indicia of such a veneer. A control device that includes a faceplate having a veneer with machined indicia may be configured with an illuminated interior, such that the indicia machined in the veneer may be backlit when the faceplate is attached to the control device. In this regard, a control device may be configured with a backlit faceplate. A control device may be implemented with a backlit faceplate in addition to, or in place of, being implemented with backlit buttons.

The invention claimed is:

1. A control device comprising:

an actuator;

a button comprising:

a translucent button body, the button body having a post extending from a rear surface of the button body and aligned with the actuator and having a plurality of spaced apart lenses disposed on the rear surface of the button body to disperse light; and a veneer disposed upon a front surface of the button body and including an area forming an indicia, the veneer being opaque to block transmission of light through the veneer except for the area forming the indicia; and a button lighting circuit and an associated lighting element.

2. The control device of claim 1, wherein the lenses are disposed around the post.

3. The control device of claim 1, wherein the lenses are disposed symmetrically around the post.

4. The control device of claim 1, wherein the veneer flexes sufficiently to allow mechanical actuation of the actuator.

5. The control device of claim 1, wherein the veneer further comprises a plurality of side walls surrounding respective sides of the button body to block transmission of light through the side walls.

6. The control device of claim 1, wherein the button lighting circuit and the associated lighting element are configured to operate at a first illumination intensity and a second illumination intensity.

7. The control device of claim 6, wherein, when the button is actuated by a user, the control device is configured to change the associated lighting element from the first illumination intensity to the second illumination intensity.

8. A control device comprising:

a button comprising:

a translucent button body;

a plurality of spaced apart lenses disposed on a rear surface of the button body to disperse light; and a veneer disposed upon a front surface of the button body and including an area forming an indicia, the veneer being opaque to block transmission of light through the veneer except for the area forming the indicia; and a button lighting circuit and an associated lighting element.

9. The control device of claim 8, wherein the veneer further comprises a plurality of side walls surrounding respective sides of the button body to block transmission of light through the side walls.

10. The control device of claim 8, wherein the button lighting circuit and the associated lighting element are configured to operate at a first illumination intensity and a second illumination intensity.

11. The control device of claim 10, wherein, when the button is actuated by a user, the control device is configured to change the associated lighting element from the first illumination intensity to the second illumination intensity.

12. The control device of claim 8, further comprising an actuator, wherein the button body further comprises a post extending from the rear surface of the button body and aligned with the actuator.

13. The control device of claim 12, wherein the veneer flexes sufficiently to allow mechanical actuation of the actuator.

14. The control device of claim 12, wherein the lenses are disposed around the post.

15. The control device of claim 12, wherein the lenses are disposed symmetrically around the post.

16. A method of forming an indicia for an illuminated button of a control device, method comprising:

providing a translucent button body with a plurality of spaced apart lenses disposed on a rear surface of the button body to disperse light through the button body;

forming a shape of the indicia on a veneer layer, the veneer being opaque to block transmission of light through the veneer except for an area defining the indicia; and disposing the veneer upon a front surface of the button body.

17. The method of claim 16, further comprising forming at least one opening through the veneer to define the indicia.

18. The method of claim 17, further comprising forming at least one rib adjacent to the opening, wherein the rib has a height that is less than the thickness of the veneer.

19. The method of claim 17, further comprising disposing a translucent filler material in the opening.

20. The method of claim 19, wherein the translucent filler material is disposed substantially coplanar with a front surface of the veneer.

* * * * *